Figure 1:
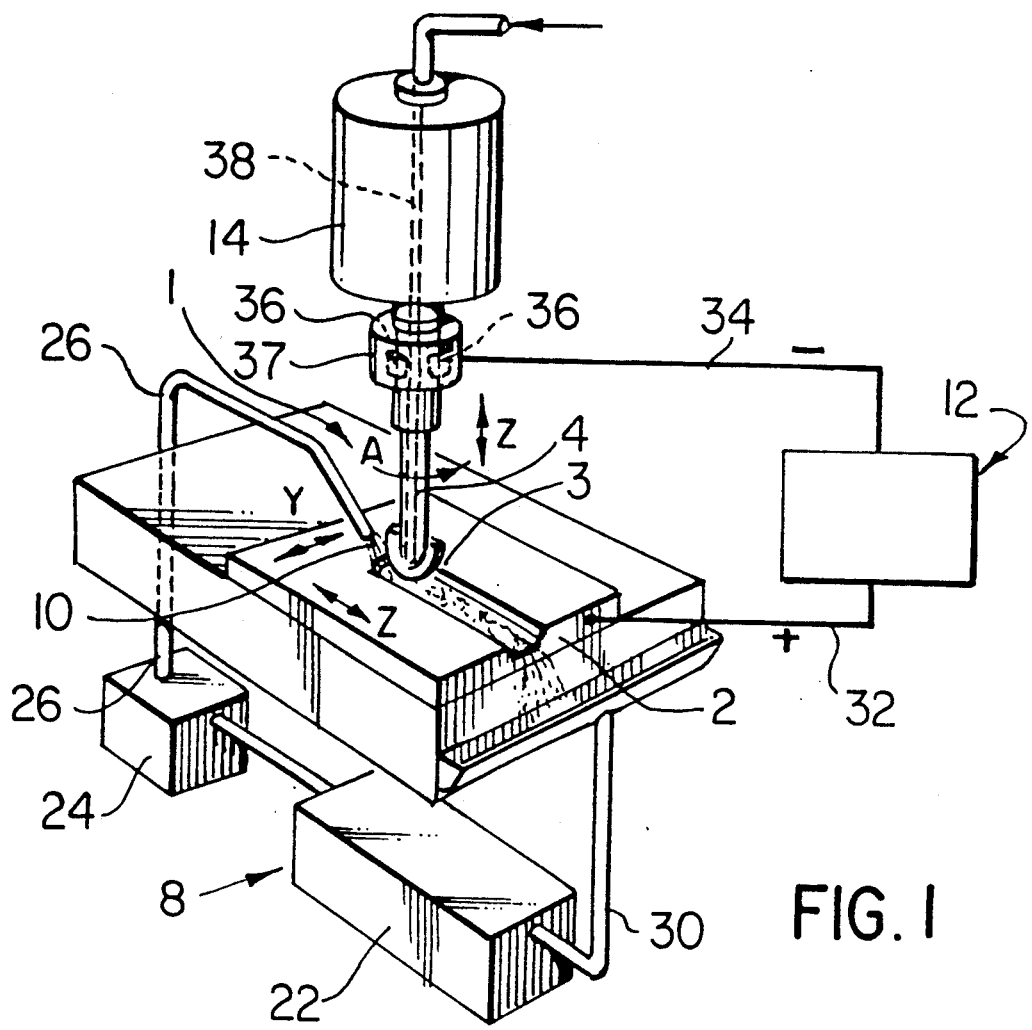

United States Patent [19]

McGregor

[11] Patent Number: 5,045,161
[45] Date of Patent: Sep. 3, 1991

[54] METHOD AND APPARATUS FOR ELECTROLYTICALLY ASSISTING THE MECHANICAL SHAPING OF A WORKPIECE

[75] Inventor: Gavin McGregor, Gloucester, Canada

[73] Assignee: National Research Council, Canada

[21] Appl. No.: 466,241

[22] Filed: Jan. 17, 1990

[51] Int. Cl.$^5$ .................... B23H 3/04; B23H 3/10; B23H 9/00
[52] U.S. Cl. ...................... 204/129.46; 204/129.5; 204/129.6; 204/212; 204/217; 204/224 M
[58] Field of Search ............. 204/129.46, 129.5, 129.6, 204/224 M, 212, 217

[56] References Cited

U.S. PATENT DOCUMENTS

| | | | |
|---|---|---|---|
| 2,739,935 | 3/1956 | Kehl et al. | 204/224 M X |
| 2,793,992 | 5/1957 | Heuser | 204/129.46 X |
| 3,017,340 | 1/1962 | Williams | 204/224 M X |
| 3,130,138 | 4/1964 | Faust et al. | 204/224 M X |
| 3,424,054 | 1/1969 | Cook et al. | 204/224 M X |
| 3,565,775 | 2/1971 | Bouchet et al. | 204/224 M X |
| 3,650,936 | 3/1972 | Towle | 204/129.46 X |
| 3,852,176 | 12/1974 | Rosenthal | 204/129.46 |
| 3,873,512 | 3/1975 | Latanision | 204/129.46 |

Primary Examiner—Donald R. Valentine
Attorney, Agent, or Firm—Eckert, Seamans, Cherin & Mellott

[57] ABSTRACT

A method and apparatus for electrolytically assisting the mechanical shaping of a workpiece is provided which is particularly useful for precision machining. A tool is used comprising an electrically conductive (copper alloy) tool shank, a cutting tool of an electrically insulating material (reinforced ceramic), and means for flooding a gap, between the tool shank and the localized electrically conductive surface layer to be shaped, with a stream of electrolyte. With the electrolyte flowing, and a low voltage, direct current applied across the gap using the localized, electrically conductive surface layer as the anode and the tool shank as the cathode, the structure of the localized, electrically conductive surface layer of the workpiece just ahead of the tool is weakened structurally sufficiently to be removed easily by the cutting tool in discrete form and carried away from the tool by the stream of electrolyte. The structural weakening of the surface layer, rather than electrolytic removal thereof, is obtained by using an appropriate d.c. current only for a sufficient length of time for the surface layer to be structurally weakened.

14 Claims, 2 Drawing Sheets

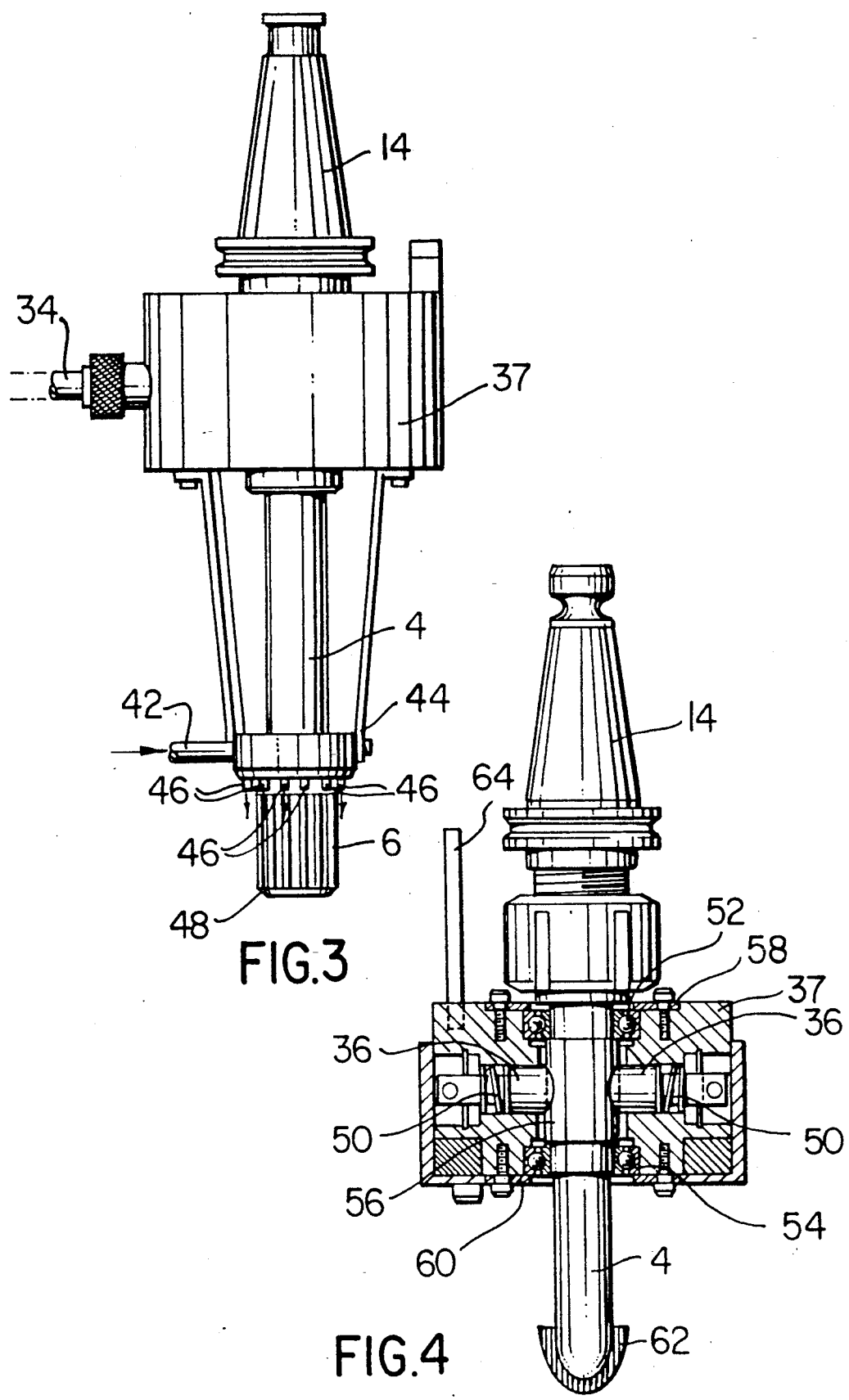

METHOD AND APPARATUS FOR ELECTROLYTICALLY ASSISTING THE MECHANICAL SHAPING OF A WORKPIECE

The invention relates to an electrolytic, localized surface layer loosening and removing tool for machining electrically conductive surfaces.

There are two well known methods of machining workpieces using electrolytic action and these are:

i) Electrochemical Machining (ECM) which is done by using a cathode having the shape of the part to be machined. The shape on the cathode is transferred to the workk piece (anode) by deplating, similar to electroplating in accordance with Faraday's Laws. An electrically conductive solution, electrolyte, is pumped at high pressure between the cathode and the work piece (anode) and prevents the deplated material from plating out on the cathode, see, for example, Precision Engineering, April 1988.

ii) Electrochemical Grinding (ECG). In this process the cathode is a grinding wheel. As the electric current flows between the workpiece and the wheel the material removed by electrolysis is carried off by the abrasives in the rotating wheel. The wheel is made of a conductive material into which abrasive particles have been imbedded, see, for example, Precision Engineering, April 1988.

The above processes have their respective places in industry. ECM is used extensively in shaping parts like turbine blades and is considered in general to be a high volume process. For general cutting and shaping more conventional lathes and milling machines are used. The advent of electrical discharge machining (EDM) has also resulted in the ECM process being relegated to specialized work, mainly because of the difference in capital cost and the time taken to produce cathodes. Electrochemical grinding (ECG) is also used in specialized areas, e.g. the grinding of flat surfaces or cutting formed surfaces with preformed grinding wheels.

It has also been proposed in U.S. Pat. No. 3,873,512, dated Mar. 25, 1975, R. M. Latanision, to machine a metallic workpiece with a worktool by passing an electrolyte in contact with the workpiece; immersing an auxiliary electrode in said electrolyte; providing a reference electrode; applying an electrical potential to the workpiece, in relation to the reference electrode, sufficient to control the mechanical and physical properties of the workpiece without significantly chemically deplating metal from the workpiece; and removing metal from the workpiece principally by the frictional movement of the worktool in direct contact with the workpiece.

While the processes described above are useful, there is a need for a process where the area of the electrolytic action is very highly localized to the cutting tool, where, under the control of a computer, precise removal of material by the cutting tool from an electrically conductive surface is achieved in a discrete, particulate form, and the stream of electrolyte floods the localized area to entrain and wash away material as it is being removed from the electrically conductive surface by the cutting tool.

According to the present invention there is provided a method of electrolytically assisting the mechanical shaping of a workpiece, comprising:

a) directing a stream of electrolyte to flood a qap immediately ahead of a Cutting tool of electrical insulating material and between a cathode and a localized, electrically conductive surface layer of a workpiece, b) applying a low voltage, direct current across the gap using the localized surface layer of the workpiece as the anode, c) moving the cutting tool to remove the localized surface layer, and wherein the improvement comprises d) the low voltage direct current is of such a magnitude and is applied only for a sufficient length of time for the surface layer ahead of the cutting tool to be structurally weakened electrolytically for easy removal by the cutting tool in a discrete, particulate form which is washed away by entrainment in the electrolyte.

The direct current applied across the gap may be in the range of about 10 to about 100 amps.

The low voltage, direct current may be applied across the gap from an electrically conductive tool shank anode of the cutting tool.

The stream of electrolyte may pass along a bore in the tool shank and be delivered to the gap by exit ports in the tool shank.

Further, according to the present invention, there is provided an apparatus for electrolytically assisting the mechanical shaping of a workpiece, comprising:

a) an electrically conductive tool shank forming a cathode, b) a cutting tool of electrical insulating material mounted on an end of the tool shank for, in operation, relative cutting movement between the cutting tool and a conductive surface layer to be shaped, while a low voltage, direct current applying gap is maintained ahead of the cutting tool and between the tool shank and a localized surface layer of conductive surface layer, and c) means for directing a localized flow of electrolyte to flood the gap, whereby, in operation, d) when the conductive surface layer is energized as an anode with a low voltage direct current, e) a stream of electrolyte from the said means floods the gap, f) the tool shank forms a cathode, g) relative cutting movement is caused between the cutting tool and the energized conductive surface, and h) localized surface portions of the conductive surface layer ahead of the cutting tool are progressively electrolytically weakened and removed by the cutting tool in a discrete particulate form, and the material thus removed in particulate form is washed from the cutting tool by the stream of electrolyte.

The tool shank may have an electrolyte conveying bore extending therealong, and exit ports from the bore for delivering electrolyte to the gap.

The tool shank may be mounted for rotation in a casing, and brushes may be provided in the casing in electrically conductive contact with the tool shank for, in operation, conveying the low voltage, direct current therefrom.

Figure 2:
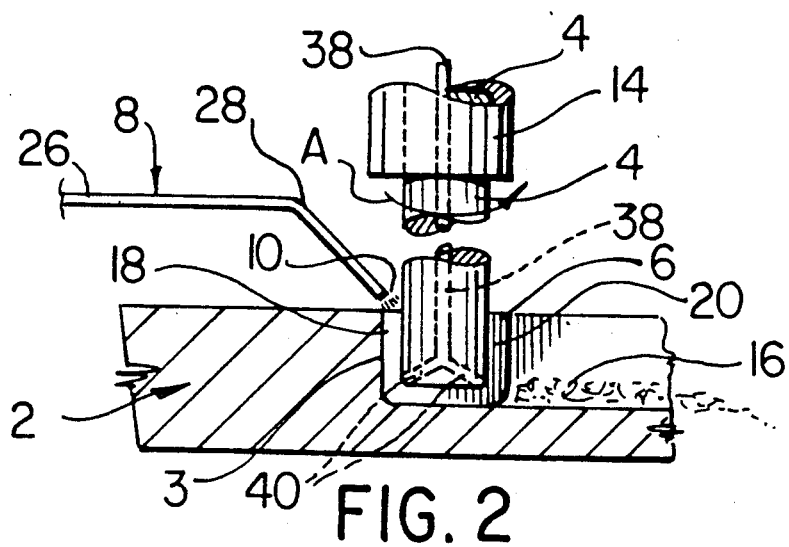

In the accompanying drawings which illustrate, by way of example, embodiments of the present invention, FIG. 1 is a schematic view of an apparatus for electrolytically assisting the mechanical shaping of a localized surface layer of a workpiece, FIG. 2 is a partly sectioned side view of a tool shown in FIG. 1, and FIGS. 3 and 4 are sectional side views of two different tools to that shown in FIGS. 1 and 2.

In FIGS. 1 and 2 there is shown an apparatus, generally designated 1, for electrolytically assisting the mechanical shaping of an electrically conductive surface layer 3 of a workpiece 2, comprising:

a) an electrically conductive, in this embodiment copper alloy, tool shank 4 forming a cathode, b) a cutting tool 6 (FIG. 2) of electrical insulating material, in this embodiment a reinforced ceramic material, and mounted on an end portion of the tool shank 4 for, in operation, relative cutting movement between the cutting tool 6 and the conductive surface layer 3 to be shaped while a low voltage, direct current applying gap is maintained ahead of the cutting tool and between the tool shank 4 and a localized surface layer of the conductive surface layer 3, in a direction ahead of the cutting tool and c) means generally designated 8 for directing a stream 10 of electrolyte to flood the gap, whereby, in operation, d) when the conductive surface layer 3 is energized by a source 12 as an anode with a low voltage d c current, e) the stream of electrolyte 10 from the said means 8 floods the gap, f) the tool shank 4 forms a cathode for the source 12, g) relative cutting movement is caused, in this embodiment by a spindle 14, between the cutting tool 6 and the surface layer 3, and h) localized surface portions of the conductive surface layer 3 ahead of the cutting tool 6 are progressively electrolytically weakened and removed by the cutting tool 6 in a discrete particulate form 16 (FIG. 2), and the material thus removed in particulate form is washed from the cutting tool 6 by the stream 10 of electrolyte.

The tool shank is mounted for rotation in the direction A (FIG. 1) by the spindle 14 and for movements in the directions x, y and z.

The cutting tool 6 comprises a number of cutters, two of which are shown and designated 18 and 20 (FIG. 2). The cutters such as 18 and 20, each extend as strips along and around the end of the tool shank 4, so that the tool shank 4 is held spaced from the surface layer 3 to provide a gap for the flow of electrolyte therebetween.

The means for directing a localized flow 10 of electrolyte comprises an electrolyte tank 22, a pump 24, a feed pipe 26, a nozzle 28 and a return pipe 30. The nozzle 28 directs a stream of electrolyte ahead of the cutting tool 6, in the cutting direction, and into the gap between the tool shank 4 and the surface layer 3.

The source 12 of d.c. electrical current has the positive lead 32 electrically connected to the workpiece 2 and the negative lead 34 electrically connected by brush contacts 36, in a stationary casing 37, to the tool shank 4.

In operation, with the apparatus arranged as shown in FIGS. 1 and 2, electrolyte is pumped from the tank 22 by the pump 24 and is directed as a stream by the nozzle 28 ahead of the cutting tool 6, in the Cutting direction, into the gap between the tool shank 4 and the surface layer 2. The spindle 14 is rotated in the direction A and the source 12 is used to apply a positive d.c. current along the lead 32 to the workpiece 2.

The electrolytic action, caused by the length of time that the d.c. current is applied from the tool shank 4 through the electrolyte to the surface layer 2 and the magnitude of the d.c. current are such that localized portions of the surface layer 2 ahead of the cutting tool 6 in the cutting directions x, y and z, are progressively electrolytically weakened so that as the cutting tool 6 is moved the weakened material is easily removed thereby in a discrete particulate form. It will be appreciated that the length of time that the d.c. current is applied to the surface layer 2 through the electrolyte depends on the rate of removal of material by the cutting tool 6.

The material removed by the cutting tool 6 in a discrete particulate form is swept away from the cutting tool 6, by the flow of electrolyte, and along the return pipe 30 to tank 22 where it settles or is filtered and is periodically removed for disposal.

In tests to verify the present method using the apparatus similar to that shown in FIG. 1, the workpiece was of tool steel and the material removal rates were similar to those of ECM, i.e., 2.131 cu. cm/1000 amp-mins. The cutting tool used was silicon carbide and the gap between the tool shank and the workpiece was approximately 0.284 cm with an average depth of 0.127 cm. The electrolyte was sodium chloride and was directed as a jet between the cutting tool and the workpiece at a flow rate of 4.55 L/min. The dc current used ranged between about 100 to 1,000 amps.

The tests showed that electrolytically weakening the surface layer facilitated removal of the surface layer by the cutting tool.

The tests were not intended to optimize the process but only to show that a surface could be electrolytically weakened and then removed by a cutting tool.

FIGS. 1 and 2 also show a different method of delivery of the electrolyte by means of a bore 38 along the tool shank 4 to radially extending outlets 40.

In FIGS. 3 and 4, similar parts to those shown in FIGS. 2 and 3 are designated by the same reference numerals and the previous description is relied upon to describe them.

In FIG. 3 the electrolyte is fed along a pipe 42 to a plenum 44 having outlets 46 for flooding gaps 48 exposing portions of the tool shank 4 and extending downwardly between the Cutters of the reaming tool 6.

The tool shown in FIG. 4 is for use in, for example, the embodiment shown in FIG. 1 where the electrolyte is supplied by means of the nozzle 28.

In FIG. 4, the brush contacts 36 are spring loaded, by compression springs 50, in the stationary casing 37 into electrically conductive contact with the tool shank 4. The tool shank 4 is mounted for rotation in the casing 37 by bearings 52 and 54. The bearings 52 and 54 are located against each end of a stepped portion 56 of the tool shank 4 by retaining rings 58 and 60 respectively. The tool shank 4 has a spade drill 62 mounted on an end portion. A flat nose cutter could be used instead of the spade drill 62. The stationary casing 37 has an electrically conductive pin 64 mounted to project therefrom, for, in operation, holding the casing stationary and conveying the low voltage direct current from the brushes. The pin 64 will locate in a stationary part of the machine (not shown), which is grounded and in which the spindle is mounted for rotation.

It should be pointed out that with the present invention:

1) When the invention is used in conjunction with a multi-axis, computer numerical control (CNC) machining centre it is particularly suited to the contouring and sculpturing of materials which are difficult to machine by traditional methods.

2) The entire apparatus can be fabricated to fit into any automated tool changing system found on modern CNC machines. In this way a conventional machine can be readily converted from traditional to the applicant's method of electrolytically assisted machining, if so desired.

3) Since the electrolytic action is simply to structurally weaken rather than remove material as in conventional electrochemical machining processes, the system may be used to machine poorly conducting materials such as certain ceramics.

4) With the electrolyte flowing through the centre of, say, a tool holder and exiting close to cutting edges arranged thereon as spade drills, the present invention may be used to form holes in hard, but conductive materials. This could include certain conductive ceramics and glasses.

The following is given for a better understanding of the present invention. Faraday's Law states that the mass of metal removed from an electrode is proportional to the current applied and the time for which it flows. In the process according to the present invention, material is not actually removed in accordance with Faraday's Law but addresses or adjusts the material condition just prior to reaching the point of material transfer from the anode to the cathode. The action of say a ceramic cutting tool is to remove the material in the electrolytically weakened state. The weakening or conditioning is highly localized, so the depth of "cut" is very shallow, however, the material removal rate by the cutting, or more property, the wiping or scraping tool is very high because the conditioning action is almost instantaneous, so the machine tool can move at a high surface speed.

I claim:

1. A method of electrolytically assisting the mechanical shaping a workpiece, comprising: a) directing a stream of electrolyte to flood a gap immediately ahead of a cutting tool of electrical insulating material between a cathode and a localized, electrically conductive surface layer of a workpiece, b) applying a low voltage, direct current across the gap using localized, surface layer of the workpiece as the anode, c) moving the cutting tool to remove the localized surface layer, and wherein the improvement comprises, d) applying the low voltage direct current at such a magnitude and for sufficient time for the surface layer ahead of the cutting tool to be structurally weakened electrolytically for easy removal by the cutting tool in a discrete, particulate form which is washed away by entrainment in the electrolyte, (A method according to claim 3,) wherein the stream of electrolyte passes along a bore in the tool shank and is delivered to the gap by exit ports in the tool shank.

2. A method according to claim 1 wherein the direct current applied across the gap is in the range of about 100 to about 1,000 amps.

3. A method according to claim 1, wherein the low voltage, direct current is applied across the gap from an electrically conductive tool shank (anode) cathode of the cutting tool.

4. An apparatus for electrolytically assisting the mechanical shaping of a workpiece, comprising:
    a) an electrically conductive tool shank forming a cathode,
    b) a cutting tool of electrically insulating material mounted on an end of the tool shank for, in operation, relative cutting movement between the cutting tool and a conductive surface layer to be shaped, while a low voltage, direct current applying gap is maintained ahead of the cutting tool and between the tool shank and a localized surface layer of the conductive surface layer, and
    c) means for directing a localized flow of electrolyte to flood the gap, whereby, in operation.
    d) when the conductive surface layer is energized as an anode with a low voltage direct current,
    e) a stream of electrolyte from the said means floods the gap,
    f) the tool shaft forms a cathode,
    g) relative cutting movement is caused between the cutting tool and the energized conductive surface, and
    h) localized surface portions of the conductive surface layer ahead of the cutting tool are progressively electrolytically weakened and removed by the cutting tool in a discrete particulate form, and the material thus removed in particulate form is washed from the cutting tool by the stream of electrolyte, and (An apparatus according to claim 5,) wherein the tool shank has an electrolyte conveying bore extending therealong, and exit ports from the bore for delivering electrolyte to the gap.

5. An apparatus according to claim 4, wherein the tool shank has an electrolyte conveying bore extending therealong, and exit ports from the bore for delivering electrolyte to the legalized region.

6. An apparatus according to claim 4, wherein the tool shank is mounted for rotation in a stationary casing, and brushes are provided in the casing in electrically conductive contact with the tool shank for, in operation, conveying the low voltage, direct current therefrom.

7. An apparatus according to claim 6, further comprising an electrically conductive pin mounted to project from the stationary casing, for, in operation holding the casing stationary and conveying the low voltage direct current from the brushes.

8. An apparatus for electrolytically assisting the mechanical shaping of a workpiece, comprising:
    a) an electrically conductive tool shank forming a cathode,
    b) a cutting tool of electrical insulating material mounted on an end of the tool shank for, in operation, relative cutting movement between the cutting tool and a conductive surface layer to be shaped, while a low voltage, direct current applying gap is maintained ahead of the cutting tool and. between the tool shank and a localized surface layer of the conductive surface layer, and
    c) means for directing a localized flow of electrolyte to flood the gap, whereby, in operation,
    d) when the conductive surface layer is energized as an anode with a low voltage direct current,
    e) a stream of electrolyte from the said means floods the gap,
    f) the tool shaft forms a cathode,
    g) relative cutting movement is caused between the cutting tool and the energized conductive surface, and
    h) localized surface portions of the conductive surface layer ahead of the cutting tool are progressively electrolytically weakened and removed by the cutting tool in a discrete particulate form, and the material thus removed in particulate form is washed from the cutting tool by the stream of electrolyte, and (An apparatus according to claim 5,) wherein the tool shank is mounted for rotation in a stationary casing, and brushes are provided in the casing in electrically conductive contact with the tool shank for, in operation, conveying the low voltage, direct current therefrom.

9. An apparatus according to claim 8, further comprising an electrically conductive pin mounted to project from the stationary casing, for, in operation holding the casing stationary and conveying the low voltage direct current from the brushes.

10. A method of shaping a workpiece having an electrically conductive surface layer, comprising directing a stream of electrolyte onto a localized region of the surface layer of the workpiece immediately in front of an insulating cutting tool moving relative to the workpiece; applying a low voltage, direct current between a cathode associated with the cutting tool and the conductive surface layer, said conductive surface layer forming an anode, for a sufficient time for the surface layer ahead of the cutting tool to become structurally weakened; and thereafter removing the structurally weakened material with the cutting tool, the removed material thereafter being washed away by entrainment in the electrolyte.

11. A method according to claim 10, wherein the direct current applied is in the range of about 100 to about 1,000 amps.

12. A method according to claim 10, wherein the cutting tool is mounted on a shank which forms said cathode.

13. A method according to claim 12, wherein a bore terminating in exit ports is formed in the tool shank, and the electrolyte flows through the bore to the localized region of the surface.

14. An apparatus for shaping a workpiece having an electrically conductive surface layer, comprising a insulating cutting tool mounted for movement relative to the workpiece and having a cathode associated therewith; means for directing a stream of electrolyte onto a localized region of the surface layer of the workpiece immediately in front of said insulating cutting tool; means for applying a low voltage, direct current between said cathode in the vicinity of the cutting tool and the conductive surface layer, said conductive surface layer forming an anode, for a sufficient time for the surface layer ahead of the cutting tool to become structurally weakened; and means for progressively moving said cutting tool relative to said surface layer such that the structurally weakened material is removed and the removed material is thereafter washed away by entrainment in the electrolyte.

* * * * *